(12) United States Patent
Guilford

(10) Patent No.: US 7,478,374 B2
(45) Date of Patent: Jan. 13, 2009

(54) DEBUG SYSTEM HAVING ASSEMBLER CORRECTING REGISTER ALLOCATION ERRORS

(75) Inventor: James D. Guilford, Northborough, MA (US)

(73) Assignee: Intel Corporation, Santa Clara, CA (US)

( * ) Notice: Subject to any disclaimer, the term of this patent is extended or adjusted under 35 U.S.C. 154(b) by 994 days.

(21) Appl. No.: 10/807,218

(22) Filed: Mar. 22, 2004

(65) Prior Publication Data

US 2005/0210457 A1  Sep. 22, 2005

(51) Int. Cl.
G06F 9/45 (2006.01)

(52) U.S. Cl. ....................................................... 717/140
(58) Field of Classification Search ......... 717/124–133, 717/150–161, 140
See application file for complete search history.

(56) References Cited

U.S. PATENT DOCUMENTS

| | | | |
|---|---|---|---|
| 5,418,958 A * | 5/1995 | Goebel | 717/156 |
| 5,530,866 A * | 6/1996 | Koblenz et al. | 717/144 |
| 5,684,994 A * | 11/1997 | Tanaka et al. | 717/153 |
| 5,761,514 A * | 6/1998 | Aizikowitz et al. | 717/158 |
| 5,774,730 A * | 6/1998 | Aizikowitz et al. | 717/157 |
| 5,784,066 A * | 7/1998 | Aizikowitz et al. | 345/440 |
| 6,321,379 B1 * | 11/2001 | Callahan, II | 717/141 |
| 6,463,582 B1 * | 10/2002 | Lethin et al. | 717/158 |
| 6,629,312 B1 * | 9/2003 | Gupta | 717/136 |
| 6,671,827 B2 | 12/2003 | Guilford et al. | |
| 6,684,395 B2 | 1/2004 | Johnson et al. | |
| 7,389,501 B1 * | 6/2008 | Farouki et al. | 717/152 |
| 2002/0083112 A1 | 6/2002 | Wheeler et al. | |
| 2004/0034743 A1 | 2/2004 | Wolrich et al. | |
| 2004/0205719 A1 | 10/2004 | Hooper et al. | |

OTHER PUBLICATIONS

Alfred V. Aho et al., Compilers Principles, Techniques and Tools, Sep. 12, 1985, pp. 15-19.*
Programming Itanium-Based System, Intel Press, 2001, Chapter 6.*

* cited by examiner

*Primary Examiner*—John Chavis
(74) *Attorney, Agent, or Firm*—Daly, Crowley, Mofford & Durkee, LLP

(57) ABSTRACT

An assembler, which can be provided as part of a debugger and/or development system, avoids register allocation errors, such as register bank conflicts and/or insufficient physical registers, automatically.

24 Claims, 15 Drawing Sheets

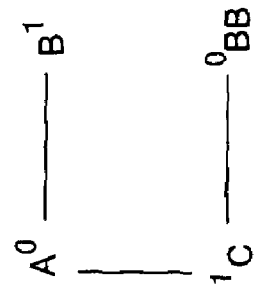
FIG. 7B
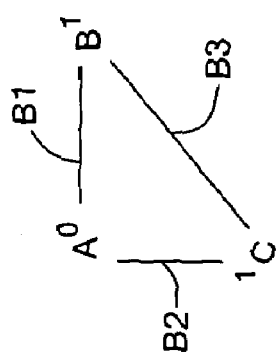
FIG. 8B
X = A + B
Y = A + C
Z = B + C
FIG. 7A
X = A + B
Y = A + C
BB = B
Z = BB + C
FIG. 8A
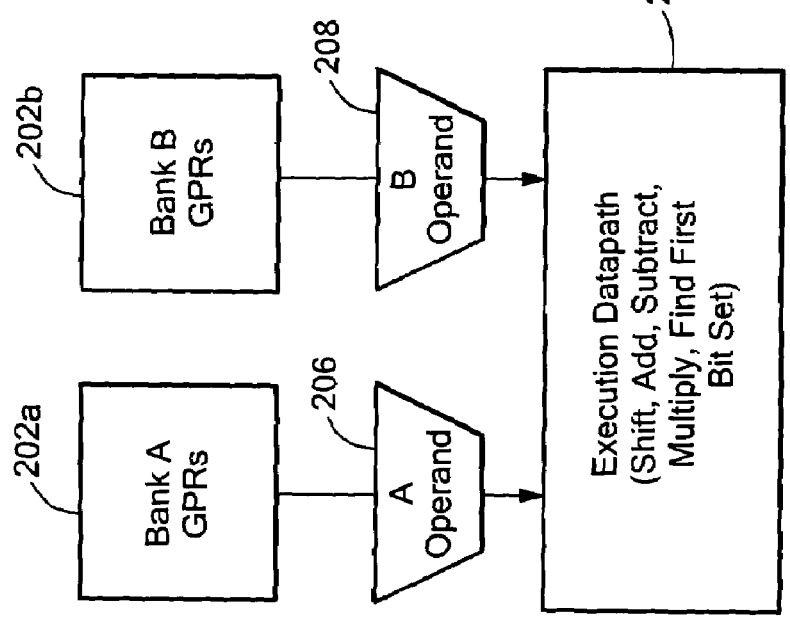
FIG. 6B

DEBUG SYSTEM HAVING ASSEMBLER CORRECTING REGISTER ALLOCATION ERRORS

CROSS REFERENCE TO RELATED APPLICATIONS

Not Applicable.

STATEMENT REGARDING FEDERALLY SPONSORED RESEARCH

Not Applicable.

FIELD OF THE INVENTION

The present invention relates generally to programming devices and, more particularly, to assembling source code to generate machine code.

BACKGROUND OF THE INVENTION

As is known in the art, some processors have multiple register banks from which operands are fed to a processing unit that performs a designated operation, e.g., shift, add, subtract etc. A first bank of registers provides operands to one port of the processing unit and the second bank of registers provide operands to a second port of the processing unit. While this arrangement has certain advantages, operands for a given instruction cannot come from the same bank of registers.

In some known assemblers, the programmer typically writes instructions using physical register names (e.g. R0) rather than virtual names (e.g., num_packets), so that register bank conflicts are generally easy to avoid. However, some assemblers enable the use of virtual names. While the ability to use virtual names provides certain advantages, such as ease of use, register bank conflict issues may become more of an issue.

A further issue that can arise in the assembly of source code can occur when the number of physical registers required by the code exceeds the number present in the target hardware.

DESCRIPTION OF DRAWINGS

FIG. 6B is a block diagram showing further details of the processing engine of FIG. 6A;

FIG. 7A is a textual representation of a code segment;

FIG. 7B is a graphical representation of the code segment of FIG. 7A;

FIG. 8A is a textual representation of a modified version of the code segment of FIG. 7A;

FIG. 8B is a graphical representation of the code segment of FIG. 8A;

DETAILED DESCRIPTION

Figure 1:
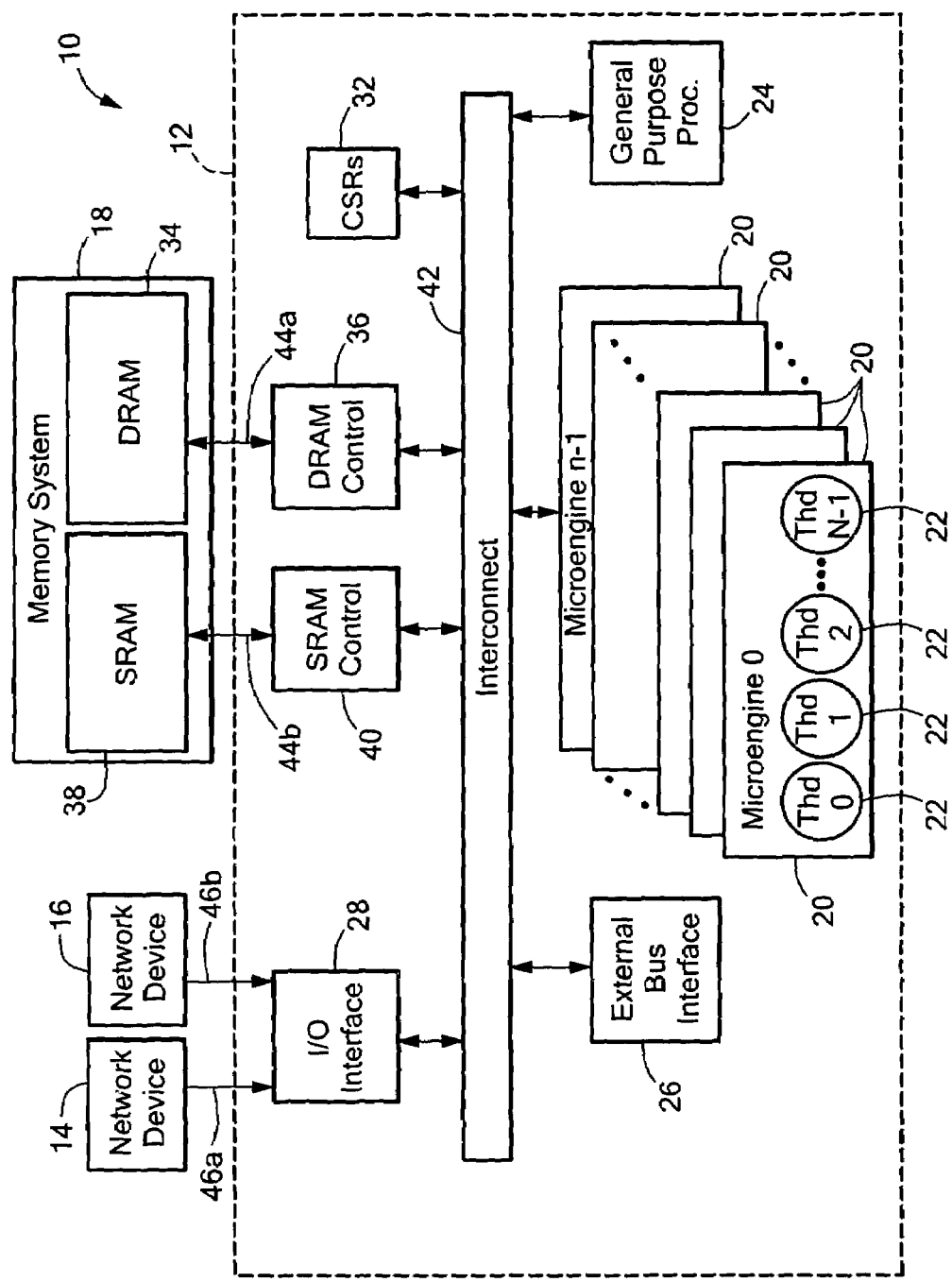
FIG. 1 is a block diagram of a processor having microengines that support multiple threads of execution.

Referring to FIG. 1, a system 10 includes a processor 12 coupled to one or more I/O devices, for example, network devices 14 and 16, as well as a memory system 18. The processor 12 includes multiple processors ("microengines" or "MEs") 20, each with multiple hardware controlled execution threads 22. In the example shown, there are "n" microengines 20, and each of the microengines 20 is capable of processing multiple threads 22, as will be described more fully below. In the described embodiment, the maximum number "N" of threads supported by the hardware is eight. Each of the microengines 20 is connected to and can communicate with adjacent microengines.

In one embodiment, the processor 12 also includes a processor 24 that assists in loading microcode control for the microengines 20 and other resources of the processor 12, and performs other general-purpose computer type functions such as handling protocols and exceptions. In network processing applications, the processor 24 can also provide support for higher layer network processing tasks that cannot be handled by the microengines 20.

The microengines 20 each operate with shared resources including, for example, the memory system 18, an external bus interface 26, an I/O interface 28 and Control and Status Registers (CSRs) 32. The I/O interface 28 is responsible for controlling and interfacing the processor 12 to the I/O devices 14, 16. The memory system 18 includes a Dynamic Random Access Memory (DRAM) 34, which is accessed using a DRAM controller 36 and a Static Random Access Memory (SRAM) 38, which is accessed using an SRAM controller 40. Although not shown, the processor 12 also would include a nonvolatile memory to support boot operations. The DRAM 34 and DRAM controller 36 are typically used for processing large volumes of data, e.g., in network applications, processing of payloads from network packets. In a networking implementation, the SRAM 38 and SRAM controller 40 are used for low latency, fast access tasks, e.g., accessing look-up tables, storing buffer descriptors and free buffer lists, and so forth.

The devices 14, 16 can be any network devices capable of transmitting and/or receiving network traffic data, such as framing/MAC devices, e.g., for connecting to 10/100BaseT Ethernet, Gigabit Ethernet, ATM or other types of networks, or devices for connecting to a switch fabric. For example, in one arrangement, the network device 14 could be an Ethernet MAC device (connected to an Ethernet network, not shown)

that transmits data to the processor 12 and device 16 could be a switch fabric device that receives processed data from processor 12 for transmission onto a switch fabric.

In addition, each network device 14, 16 can include a plurality of ports to be serviced by the processor 12. The I/O interface 28 therefore supports one or more types of interfaces, such as an interface for packet and cell transfer between a PHY device and a higher protocol layer (e.g., link layer), or an interface between a traffic manager and a switch fabric for Asynchronous Transfer Mode (ATM), Internet Protocol (IP), Ethernet, and similar data communications applications. The I/O interface 28 may include separate receive and transmit blocks, and each may be separately configurable for a particular interface supported by the processor 12.

Other devices, such as a host computer and/or bus peripherals (not shown), which may be coupled to an external bus controlled by the external bus interface 26 can also serviced by the processor 12.

In general, as a network processor, the processor 12 can interface to any type of communication device or interface that receives/sends data. The processor 12 functioning as a network processor could receive units of information from a network device like network device 14 and process those units in a parallel manner. The unit of information could include an entire network packet (e.g., Ethernet packet) or a portion of such a packet, e.g., a cell such as a Common Switch Interface (or "CSIX") cell or ATM cell, or packet segment. Other units are contemplated as well.

Each of the functional units of the processor 12 is coupled to an internal bus structure or interconnect 42. Memory busses 44a, 44b couple the memory controllers 36 and 40, respectively, to respective memory units DRAM 34 and SRAM 38 of the memory system 18. The I/O Interface 28 is coupled to the devices 14 and 16 via separate I/O bus lines 46a and 46b, respectively.

Figure 2:
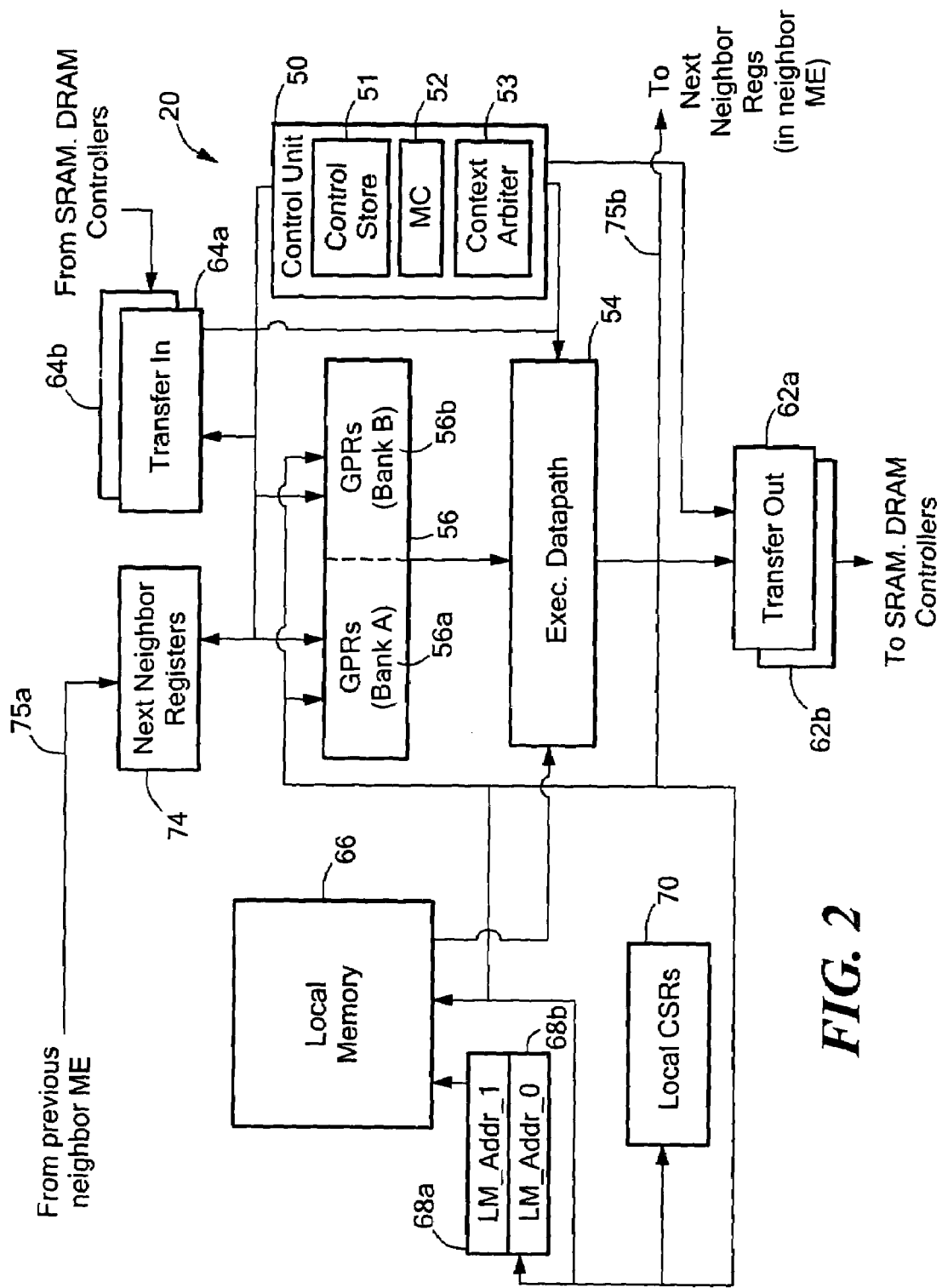
FIG. 2 is a block diagram of a microengine (ME)

Referring to FIG. 2, an exemplary one of the microengines 20 is shown. The microengine (ME) 20 includes a control unit 50 that includes a control store 51, control logic (or microcontroller) 52 and a context arbiter/event logic 53. The control store 51 is used to store microcode. The microcode is loadable by the processor 24. The functionality of the ME threads 22 is therefore determined by the microcode loaded via the core processor 24 for a particular user's application into the microengine's control store 51.

The microcontroller 52 includes an instruction decoder and program counter (PC) units for each of the supported threads. The context arbiter/event logic 53 can receive messages from any of the shared resources, e.g., SRAM 38, DRAM 34, or processor core 24, and so forth. These messages provide information on whether a requested function has been completed.

The ME 20 also includes an execution datapath 54 and a general purpose register (GPR) file unit 56 that is coupled to the control unit 50. The datapath 54 may include a number of different datapath elements, e.g., an ALU, a multiplier and a Content Addressable Memory (CAM).

The registers of the GPR file unit 56 (GPRs) are provided in two separate banks, bank A 56a and bank B 56b. The GPRs are read and written exclusively under program control. The GPRs, when used as a source in an instruction, supply operands to the datapath 54. When used as a destination in an instruction, they are written with the result of the datapath 54. The instruction specifies the register number of the specific GPRs that are selected for a source or destination. Opcode bits in the instruction provided by the control unit 50 select which datapath element is to perform the operation defined by the instruction.

The ME 20 further includes write transfer (transfer out) register file 62 and a read transfer (transfer in) register file 64. The write transfer registers of the write transfer register file 62 store data to be written to a resource external to the microengine. In the illustrated embodiment, the write transfer register file is partitioned into separate register files for SRAM (SRAM write transfer registers 62a) and DRAM (DRAM write transfer registers 62b). The read transfer register file 64 is used for storing return data from a resource external to the microengine 20. Like the write transfer register file, the read transfer register file is divided into separate register files for SRAM and DRAM, register files 64a and 64b, respectively. The transfer register files 62, 64 are connected to the datapath 54, as well as the control store 50. It should be noted that the architecture of the processor 12 supports "reflector" instructions that allow any ME to access the transfer registers of any other ME.

Also included in the ME 20 is a local memory 66. The local memory 66 is addressed by registers 68a ("LM_Addr_1"), 68b ("LM_Addr_0"), which supplies operands to the datapath 54, and receives results from the datapath 54 as a destination.

The ME 20 also includes local control and status registers (CSRs) 70, coupled to the transfer registers, for storing local inter-thread and global event signaling information, as well as other control and status information. Other storage and functions units, for example, a Cyclic Redundancy Check (CRC) unit (not shown), may be included in the microengine as well.

Other register types of the ME 20 include next neighbor (NN) registers 74, coupled to the control store 50 and the execution datapath 54, for storing information received from a previous neighbor ME ("upstream ME") in pipeline processing over a next neighbor input signal 76a, or from the same ME, as controlled by information in the local CSRs 70. A next neighbor output signal 76b to a next neighbor ME ("downstream ME") in a processing pipeline can be provided under the control of the local CSRs 70. Thus, a thread on any ME can signal a thread on the next ME via the next neighbor signaling.

Figure 3:
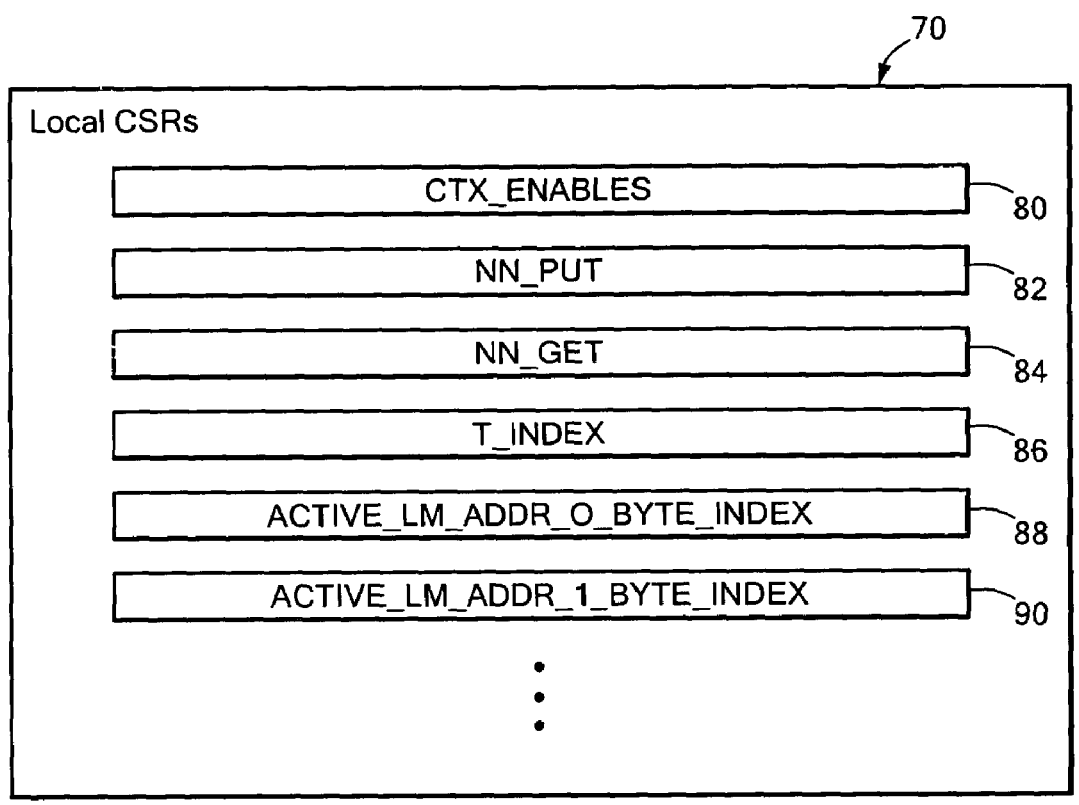
FIG. 3 is a depiction of some local Control and Status Registers (CSRs) of the ME (from FIG. 2)

Generally, the local CSRs 70 are used to maintain context state information and inter-thread signaling information. Referring to FIG. 3, registers in the local CSRs 70 may include the following: CTX_ENABLES 80; NN_PUT 82; NN_GET 84; T_INDEX 86; ACTIVE_LM ADDR_0_BYTE_INDEX 88; and ACTIVE_LM ADDR_1_BYTE_INDEX 90. The CTX_ENABLES register 80 specifies, among other information, the number of contexts in use (which determines GPR and transfer register allocation) and which contexts are enabled. It also controls how NN mode, that is, how the NN registers in the ME are written (NN_MODE='0' meaning that the NN registers are written by a previous neighbor ME, NN_MODE='1' meaning the NN registers are written from the current ME to itself). The NN_PUT register 82 contains the "put" pointer used to specify the register number of the NN register that is written using indexing. The NN_GET register 84 contains the "get" pointer used to specify the register number of the NN register that is read when using indexing. The T_INDEX register 86 provides a pointer to the register number of the transfer register (that is, the S_TRANSFER register 62a or D_TRANSFER register 62b) that is accessed via indexed mode, which is specified in the source and destination fields of the instruction. The ACTIVE_LM ADDR_0_BYTE_INDEX 88 and ACTIVE_LM ADDR_1_BYTE_INDEX 90 provide pointers to the number of the location in local memory that is read or written. Reading and writing the ACTIVE_LM_ADDR_x_ BYTE_INDEX register reads and writes both the corresponding LM_ADDR_x register and BYTE INDEX registers (also in the local CSRs).

In the illustrated embodiment, the GPR, transfer and NN registers are provided in banks of 128 registers. The hardware allocates an equal portion of the total register set to each ME thread. The 256 GPRs per-ME can be accessed in thread-local (relative) or absolute mode. In relative mode, each thread access a unique set of GPRs (e.g., a set of 16 registers in each bank if the ME is configured for 8 threads). In absolute mode, a GPR is accessible by any thread on the ME. The mode that is used is determined at compile (or assembly) time by the programmer. The transfer registers, like the GPRs, can be assessed in relative mode or in absolute-mode. If accessed globally in absolute mode, they are accessd indirectly through an index register, the T_INDEX register. The T_INDEX is loaded with the transfer register number to access.

As discussed earlier, the NN registers can be used in one or two modes, the "neighbor" and "self" modes (configured using the NN_MODE bit in the CTX_ENABLES CSR). The "neighbor" mode makes data written to the NN registers available in the NN registers of a next (adjacent) downstream ME. In the "self" mode, the NN registers are used as extra GPRs. That is, data written into the NN registers is read back by the same ME. The NN_GET and NN_PUT registers allow the code to treat the NN registers as a queue when they are configured in the "neighbor" mode. The NN_GET and NN_PUT CSRs can be used as the consumer and producer indexes or pointers into the array of NN registers.

At any give time, each of the threads (or contexts) of a given ME is in one of four states: inactive; executing; ready and sleep. At most one thread can be in the executing state at a time. A thread on a multi-threaded processor such as ME 20 can issue an instruction and then swap out, allowing another thread within the same ME to run. While one thread is waiting for data, or some operation to complete, another thread is allowed to run and complete useful work. When the instruction is complete, the thread that issued it is signaled, which causes that thread to be put in the ready state when it receives the signal. Context switching occurs only when an executing thread explicitly gives up control. The thread that has transitioned to the sleep state after executing and is waiting for a signal is, for all practical purposes, temporarily disabled (for arbitration) until the signal is received.

Figure 4:
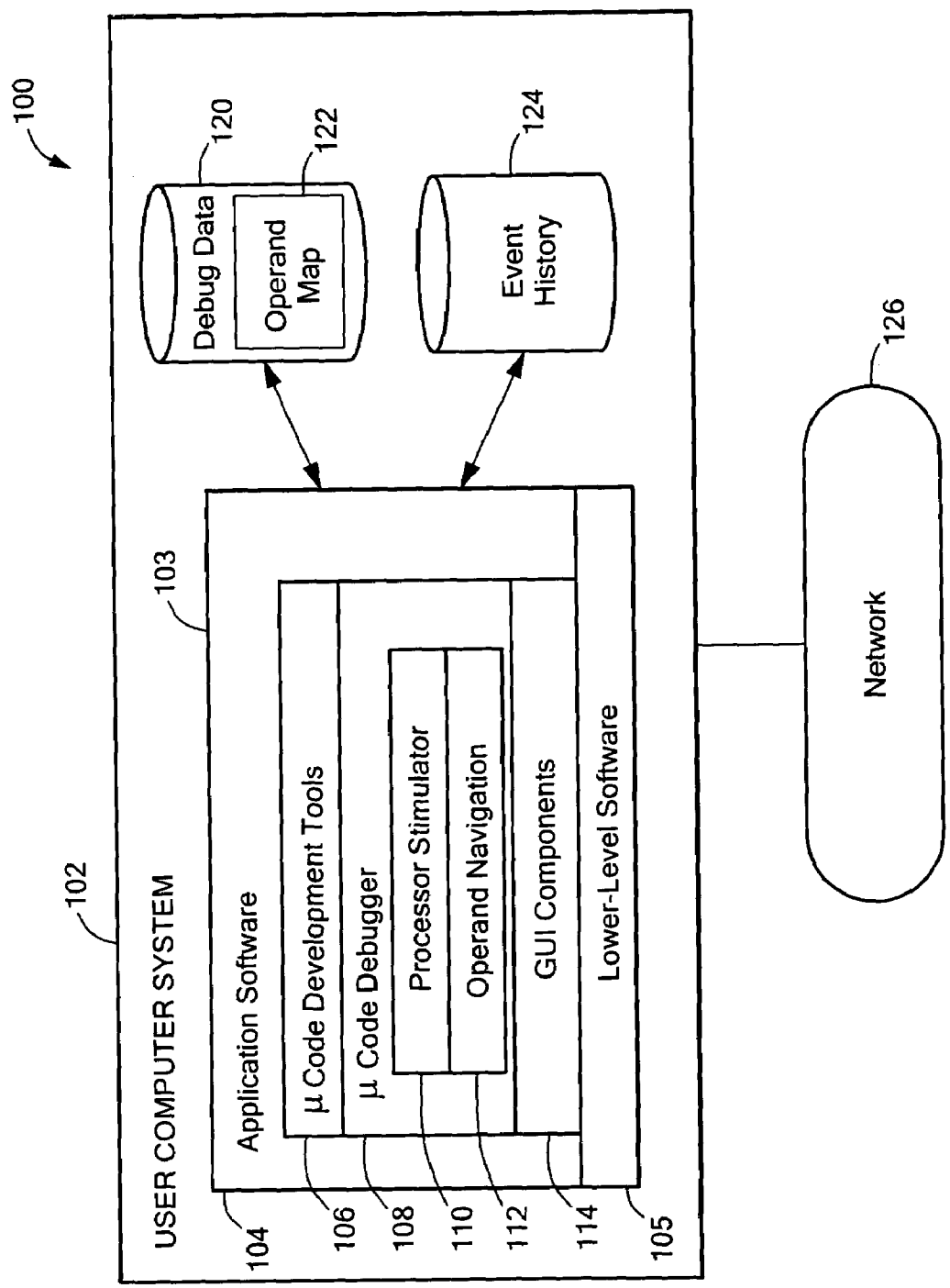
FIG. 4 is an exemplary environment in which a development/debugging system is usable to debug microcode to be executed by the threads of the ME shown in FIG. 2.

FIG. 4 shows an integrated development/debugger system environment 100 that includes a user computer system 102. The computer system 102 is configured to debug microcode that is intended to execute on a processing element. In one embodiment, to be described, the processing element is the ME 20, which may operate in conjunction with other MEs 20, as shown in FIGS. 1-2. Software 103 includes both upper-level application software 104 and lower-level software (such as an operating system or "OS") 105. The application software 104 includes microcode development tools 106 (for example, in the example of processor 12, a compiler and/or assembler, and a linker, which takes the compiler or assembler output on a per-ME basis and generates an image file for all specified MEs). The application software 104 further includes a source level microcode debugger 108, which include a processor simulator 110 (to simulate the hardware features of processor 12) and an Operand Navigation mechanism 112. Also include in the application software 104 are GUI components 114, some of which support the Operand Navigation mechanism 112. The Operand Navigation 112 can be used to trace instructions, and more particularly, instruction operands, during debug, as will be described.

Still referring to FIG. 4, the system 102 also includes several databases. The databases include debug data 120, which is "static" (as it is produced by the compiler/linker or assembler/linker at build time) and includes an Operand Map 122, and an event history 124. The event history stores historical information (such as register values at different cycle times) that is generated over time during simulation. The system 102 may be operated in standalone mode or may be coupled to a network 126 (as shown).

Figure 5:
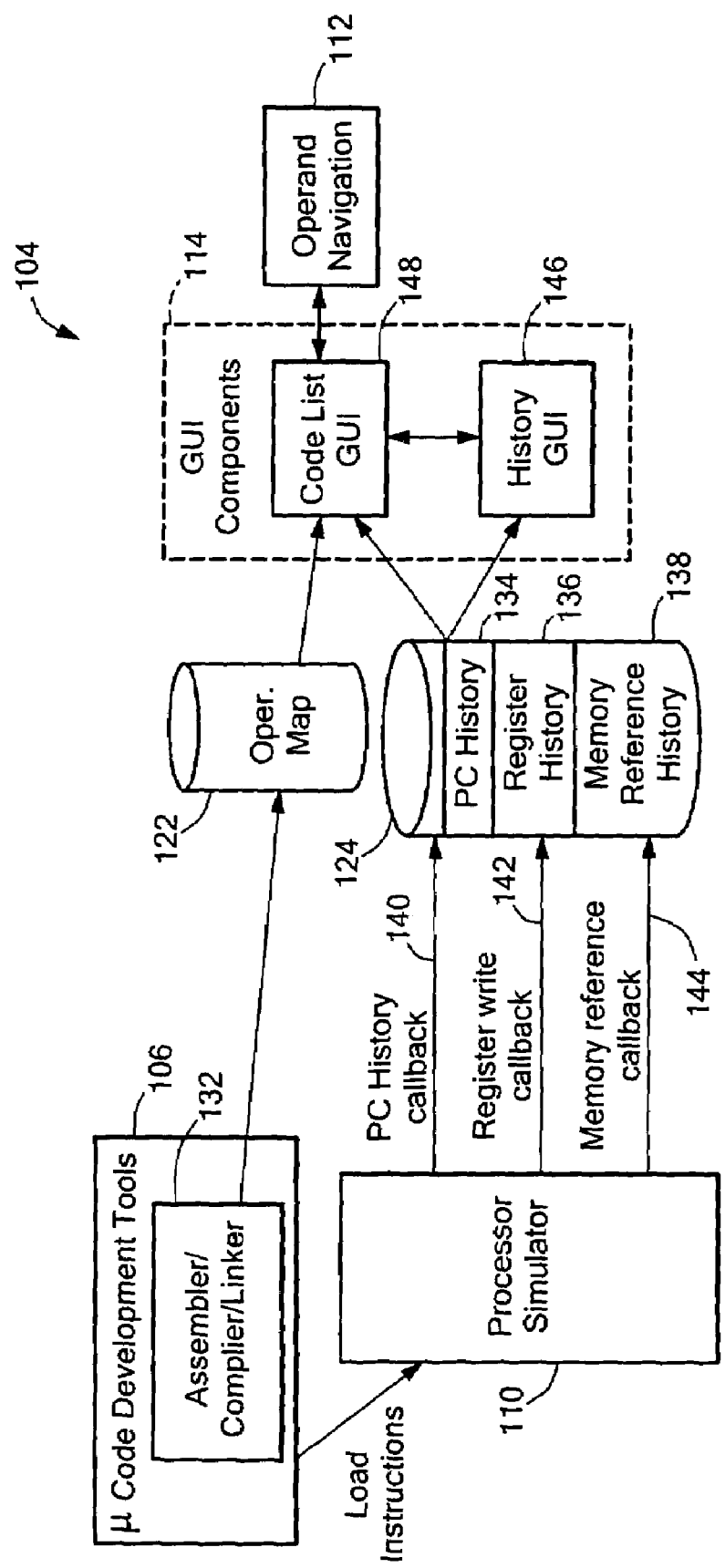
FIG. 5 is a block diagram illustrating the various components of the development/debugger system (from FIG. 4) needed to perform an "Operand Navigation"

FIG. 5 shows a more detailed view of the various components of the application software 104, in particular those components that are needed to perform an instruction oper-and trace. They include an assembler and/or compiler, as well as linker 132; the processor simulator 110; the Event History 124; the (Instruction) Operation Map 126; GUI components 114; and the Operand Navigation process 112. The Event History 124 includes a Thread (Context)/PC History 134, a Register History 136 and a Memory Reference History 138. These histories, as well as the Operand Map 122, exist for every ME 20 in the processor 12.

The assembler and/or compiler produce the Operand Map 122 and, along with a linker, provide the microcode instructions to the processor simulator 110 for simulation. During simulation, the processor simulator 110 provides event notifications in the form of callbacks to the Event History 124. The callbacks include a PC History callback 140, a register write callback 142 and a memory reference callback 144. In response to the callbacks, that is, for each time event, the processor simulator can be queried for ME state information updates to be added to the Event History. The ME state information includes register and memory values, as well as PC values. Other information may be included as well.

Collectively, the databases of the Event History 124 and the Operand Map 122 provide enough information for the Operand Navigation 112 to follow register source-destination dependencies backward and forward through the ME microcode.

In another aspect of exemplary embodiments, an assembler detects a program requirement to obtain two operands from the same bank of registers for a given instruction and 'optimizes' the code to rearrange, delete or otherwise modify instructions to eliminate the register bank contention. In an exemplary embodiment, the modification of the instructions is performed so as not to alter the results of executing the code; i.e., the modified and unmodified code has the same net effect on the final results. In one embodiment, the assembler detects an odd number of cycles in an operand graph, as described more fully below.

In an exemplary embodiment, the programmer programs with "virtual register names" rather than physical register names. The assembler than allocates these virtual registers to the physical ones within the constraints of the hardware. The inventive assembler, in the case there mapping is unsuccessful, modifies the code.

Figure 6A:
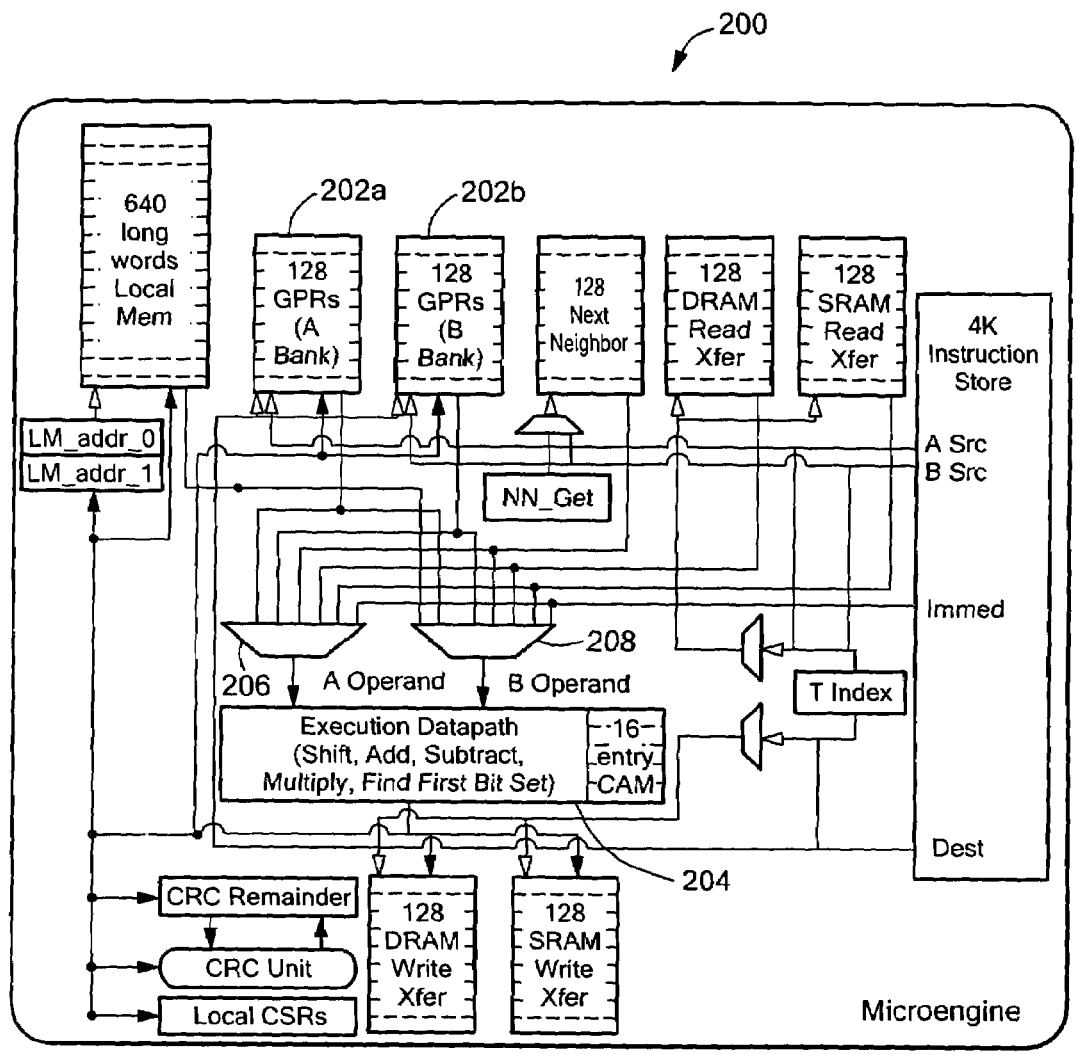
FIG. 6A is a block diagram showing certain components of a exemplary processing engine.

FIGS. 6A and 6B show an exemplary microengine configuration 200 having certain functional blocks. First and second banks 202a, 202b of general purpose registers are coupled to a processing unit 204. The first register bank 202a (register bank A) provides a first operand to the processing unit 204 via an A operand unit 206 and the second register bank 202b provides a second operand to the processing unit via a B operand unit 208. The processing unit performs the specified instruction, e.g., shift, add, subtract, multiply, etc., on the operands to produce a result.

If the code specifies that multiple operands for a given instruction come from the same bank of registers then the assembler detects this condition and corrects this error under predetermined constraints as described more fully below. By overcoming register bank contention errors in an assembler, code development efficiency is enhanced.

FIGS. 7A and 7B provide a straightforward example of a register bank conflict for multiple operands. FIG. 7A shows exemplary code instructions for operands A, B, and C. It is understood that the particular operation specified is not relevant. The illustrative instructions include A+B, A+C, and B+C. FIG. 7B shows an exemplary graphing technique, known as coloring the graph, to detect register bank conflicts. In this graph, each node A, B, C represents a register, and each edge represents a pair of registers that are both source operands in the same instruction. While none is shown, each edge may have a weight associated with it, where the weight is the number of instructions that have this pair of registers as source operands. A first edge B1 represents the instruction A+B, a second edge B2 represents the instruction A+C, and a third edge B3 from C to B represents the instruction B+C.

Starting at no node in particular, here node A, the graph is 'colored'. That is, a first symbol, which is shown as a "0" superscript, is placed near node A. Each connected node is colored with a second symbol, which is shown as a "1" superscript, near node B and node C. No connected node can have the same symbol. In the illustrated embodiment, node B and node C are connected by the edge branch B3 and have the same symbol to indicate a register bank conflict.

It is understood that a wide range of techniques can be used to detect register bank conflicts. The graph coloring technique described here is one of many techniques that will be readily apparent to one of ordinary skill in the art. In some known assemblers supporting virtual names, register bank conflicts are detected and error messages are generated. The programmer typically manually identifies the register conflict problem based upon an error message and attempts to overcome the conflict by modifying code, which may be a time-consuming process.

In an exemplary embodiment, an assembler, which can be provided as part of a debugger tool, detects register bank conflicts and modifies code to remedy the detected register bank conflict. In general, the assembler should make minimal code modifications, e.g., additional instructions, to overcome the register bank conflict.

FIG. 8A shows an exemplary code modification to the listing in FIG. 7A to remedy the register bank conflict. In general, an operand associated with a register bank conflict can be placed in a temporary register to generate an even number cycles. An additional instruction of BB=B and a change from B+C to BB+C removes the register bank conflict as shown in FIG. 8B.

Figure 9:
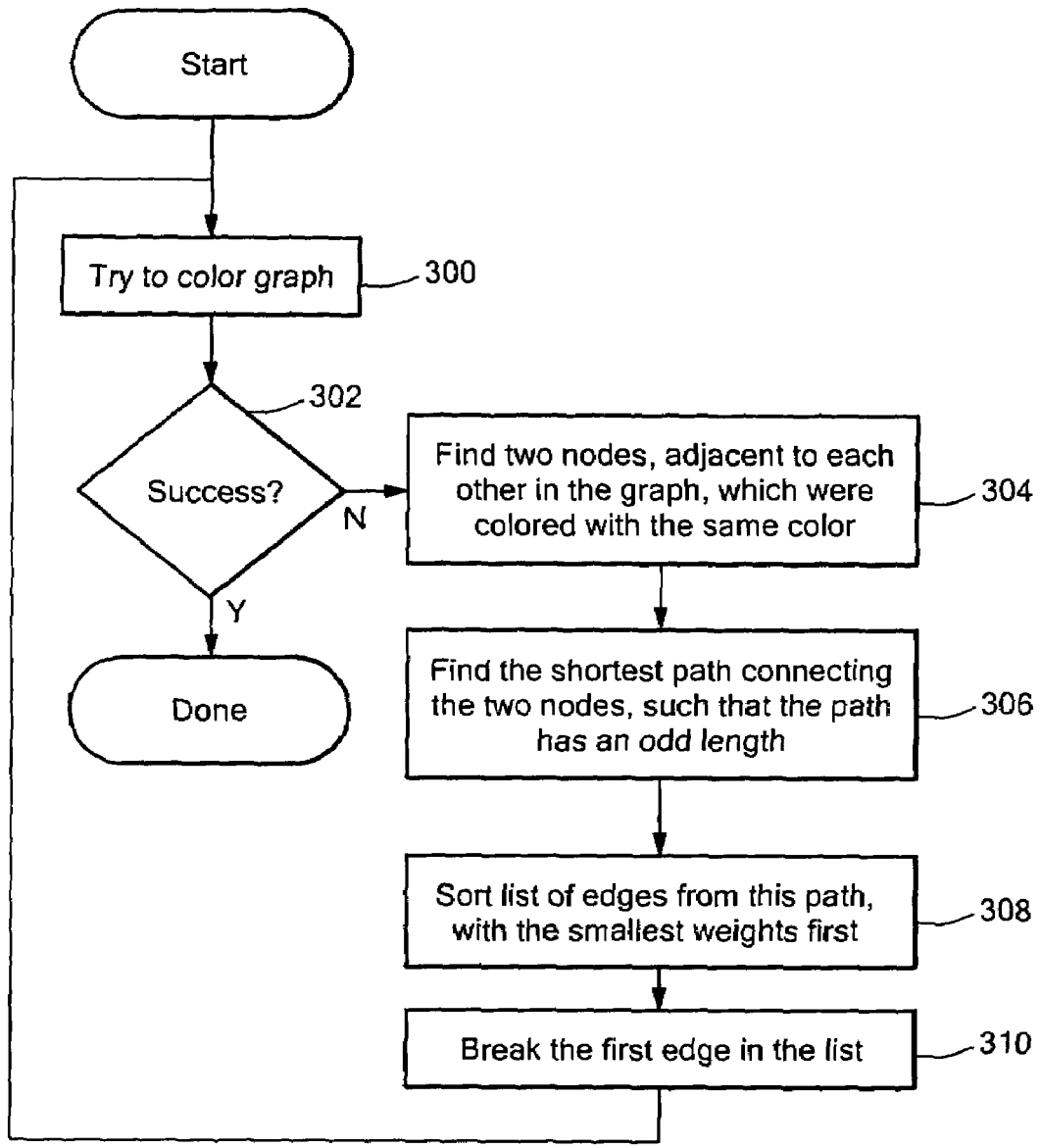
FIG. 9 is a flow diagram showing an exemplary implementation of a process to resolve register bank conflicts.

FIG. 9 shows an exemplary process implementation to detect and correct register back conflicts in assembler program code. In general, the assembler examines a register group and if the group is not colorable it attempts to determine a set of edges to be broken such that the group is colorable and the sum of the weights of the broken edges in the group is at a minimum. It is understood that a register group refers to a connected subgraph of the total register graph; i.e., disconnected portions of the register graph are considered as separate groups of registers to reduce the complexity.

In processing block 300, the assembler attempts to color the graph as shown and described in FIGS. 7A-8B, for example. In decision block 302 it is determined whether the graph was colored successfully. If so, then no register bank conflicts exist and the process is complete. If a register bank conflict was detected, in processing block 304 the assembler attempts to locate two nodes in the graph, e.g., registers, having the same color that are adjacent to each other.

In processing block 306, the assembler finds the shortest path connecting the two nodes of interest such that the path between the nodes has an odd length. From the identified path, in processing block 308 the assembler sorts a list of edges from the path. In an exemplary embodiment, the list of node edges is sorted so that the edges having the smallest weights are first. It is understood that the weight of the edges corresponds to the number of operations involving the two nodes at one time. In processing block 310, the first edge in the list is broken to modify the graph structure. It is understood that if this turns out to be the selected solution, code can be modified to implement this change, such as by inserting an instruction to copy one of the registers to a temporary register and replace the register reference with a reference to the temporary register. Processing then recursively continues in block 300 where the assembler again attempts to successfully color the graph.

It is understood that the term color the graph as used herein should be construed broadly to cover techniques in general that are suitable to detect register bank conflicts.

In an exemplary embodiment, certain edges may be deemed unbreakable for various reasons. For example, the programmer may have specified that certain instructions form a critical path and should not be modified. The edges associated with these instructions would be considered as unbreakable.

Figure 10:
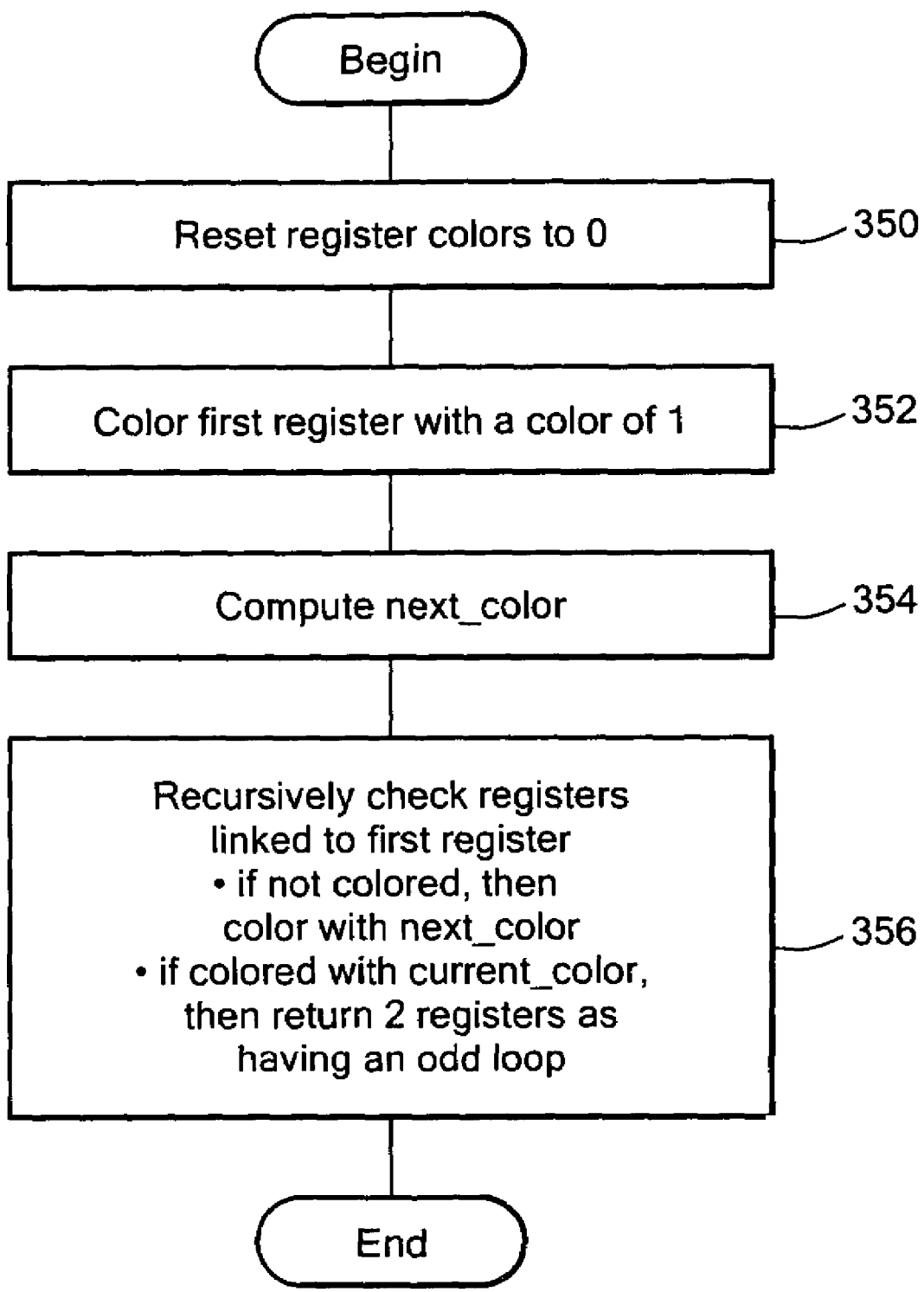
FIG. 10 is a flow diagram showing further details of the process of FIG. 9.

FIG. 10 shows an exemplary color the graph implementation. In processing block 350 the registers in the group have their colors reset to 0. In processing block 352, the first register is colored with a current_color of 1. A next_color is computed, e.g., as current_color XOR 3, in processing block 354, so that if the current color is 1, the next color is 2, and vice versa. A color of zero indicates that the node has not yet been colored.

In processing block 356, the registers linked to the first or current register are recursively checked (broken links are not checked). If the register is not colored, then it is recursively colored with the color next_color. If the register is colored with current_color, then the current and next registers are returned as two registers that are on an odd loop.

Figure 11:
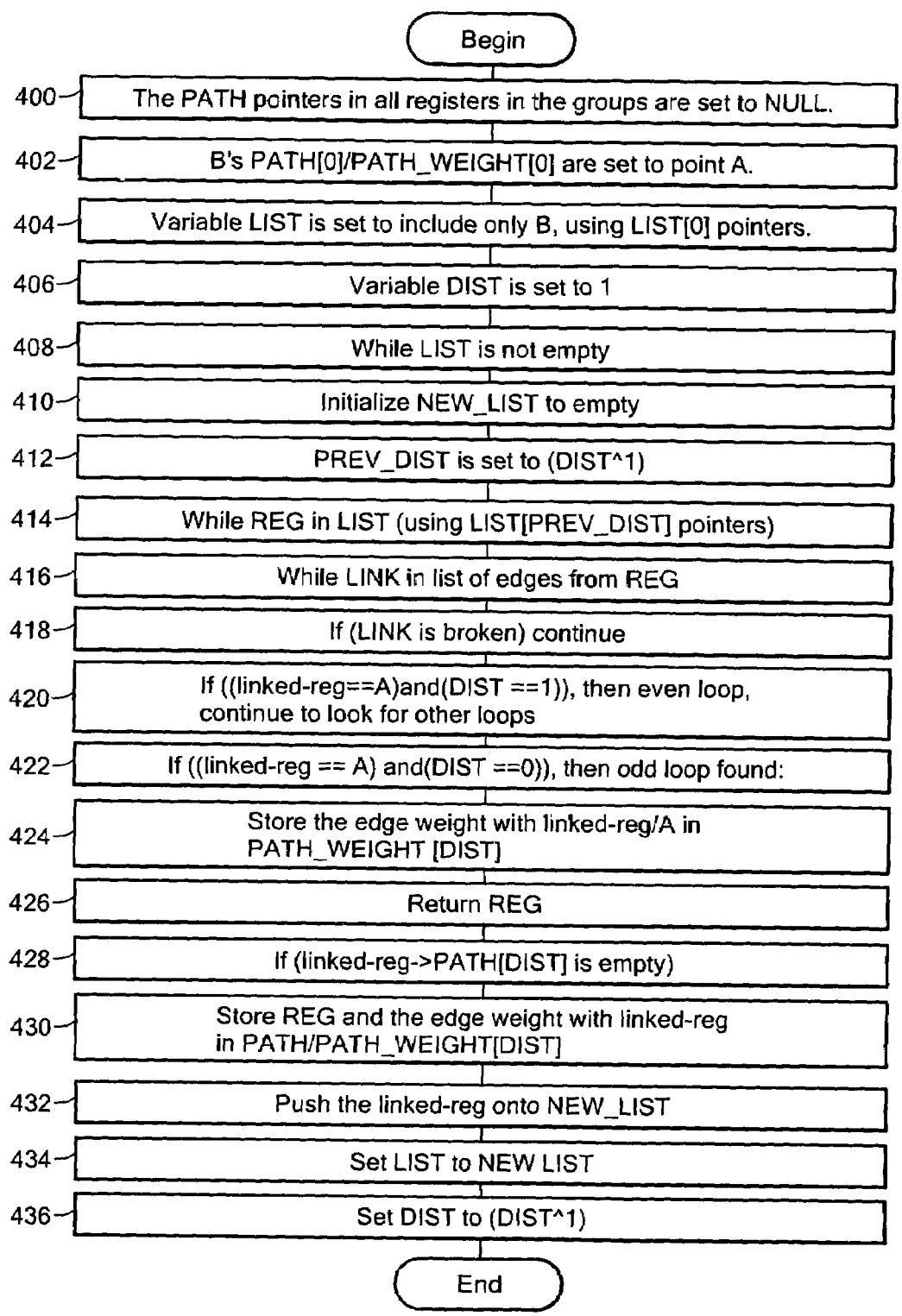
FIG. 11 is a flow diagram showing further details of the process of FIG. 9.
Figure 12:
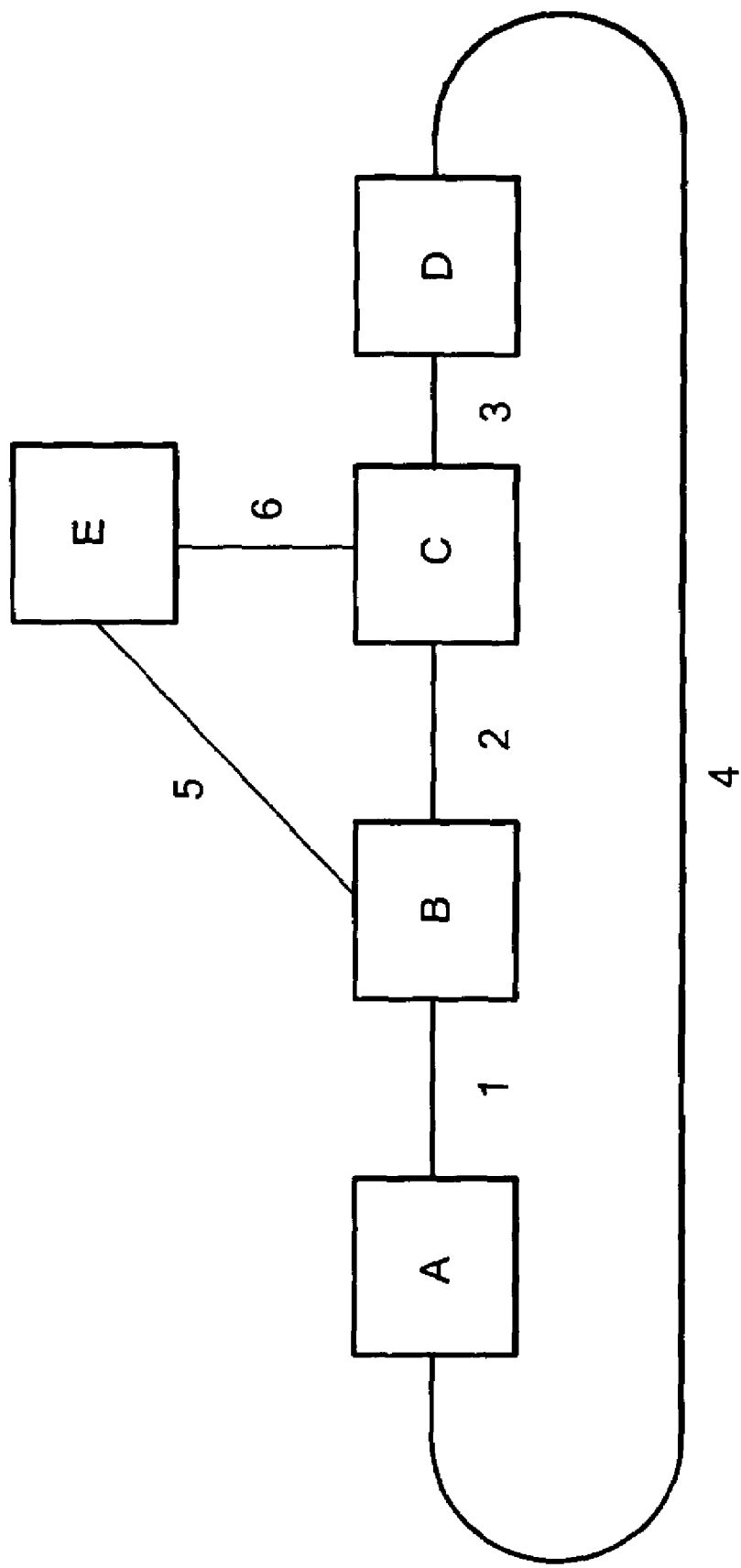
FIG. 12 is a graphical representation of register relationships.

FIGS. 11 and 12 show further details of processing of a failed graph coloring detected in the process of FIG. 9, for example. FIG. 11 shows further processing details and FIG. 12 shows an exemplary graph, where links have weights as indicated. In general, to find a shortest odd loop, one can start at one of the nodes ("B") and label each node with its distance from B until finding a node that is liked to the other input node ("A"). It should be noted that loops or cycles with an odd length are of interest. That is, the assembler should not label each node with a single distance from B because doing so may only provide a loop with even length (since the even-length loop has a shorter length than the odd-length loop).

Starting at node B and labeling each node with its distance from node A results in B-1, C-2, E-2, D-3. One could conclude that there were no shortest odd paths. So each node should be labeled with its shortest even distance and its shortest odd distance as shown below in Table 1.

TABLE 1

|   | Odd Distance | Even Distance |
|---|---|---|
| 1 | B-1 | |
| 2 | | C-2, E-2 |
| 3 | D-3, E-3, C-3 | |
| 4 | | D-4 |

And then the odd path B→E→C→D→A is found. The actual distance need not be known, just whether the distance is odd or even.

In an exemplary embodiment, in order to compute this cycle, three pieces of data are stored with the register. The first two items PATH and PATH_WEIGHT are used to represent the path back through the graph. It should be noted that there are two sets of these per register, one for the odd-distance and one for the even distance.e.g., their is PATH[0] and PATH[1]. In particular PATH is a pointer to the previous node in the path and the PATH_WEIGHT is the weight of that edge. The third item is LIST, which is a linked list of registers at a given distance from the start. Initially the list consists of B and then the nodes that are one edge further out are accumulated into a new list. The three pieces of data are replicated into an even and odd set. In one embodiment, two PATH and PATH_WEIGHT values are needed since each register can in general be on two different paths (one with an even length, and one with an odd length). Two lists should be maintained, the current one being traversed and a new one.

Referring again to FIG. 11, in processing block 400 item PATH pointers in all registers in the groups are set to NULL and in block 402 the B register items PATH[0]/PATH_WEIGHT[0] are set to point to A. As noted above, node A is somewhat arbitrarily selected as the node to begin path length computation. It is not entirely arbitrary as in this case, registers A and B are the two registers returned from the graph coloring routine, which failed due to the odd cycle.

In processing block 404, the variable LIST is set to include only register B using LIST[0] pointers and variable DIST is set to 1 in processing block 406. While variable LIST is not empty in processing block 408, variable NEW_LIST is initialized to empty in processing block 410. It is understood that in accordance with conventional programming, processing blocks appearing below block 408 all occur while variable LIST is not empty. That is, the term "while" in FIG. 11 refers to a generic WHILE programming instruction.

In processing block 412, PREV_DIST is toggled (DIST XOR 1) and while REG (a data structure representing a register) is in variable LIST (using LIST[PREV_DIST] pointers) in block 414 and while LINK is in list of edges from REG in block 416, if (LINK is broken) processing continues in block 418. In block 418, if the link is broken, processing continues in block 416. PRE_DIST toggles; i.e., 0->1->0->1 so that if PATH[0] references paths with an ODD distance and PATH[1] represents an EVEN distance, then after progressing by one edge, the length changes parity, and one deals with the other pointer. This toggling is equivalent to alternating columns in Table 1.

In processing block 420, if the linked register is equal to register A, which was arbitrarily selected, and distance variable DIST equal one, then an even loop has been found so that processing should continue to find further loops. In processing block 422, if the linked register is A and DIST is equal zero, then an odd loop has been found. In this case, the edge weight for the linked register is stored in PATH_WEIGHT[DIST] and the value in variable REG is returned in processing block 426.

In processing block 428, if PATH[DIST] is empty, then this node/register has not yet been visited for the given distance (odd/even). So we want to accumulate these nodes to be processed on the new_list, so that on the next iteration of the loop (i.e., when we are dealing with nodes one link further) we will process this node. Equivalently, if PATH[DIST] is not empty, then it has already been visited, so there is a shorter path to this node, and we should not process it further. In general, the issue here is that we are looking at labeling each node with the shortest distance to the starting node, so if it has already been labeled with a distance, it should not be re-labeled with a larger distance.

In processing block 430 REG and the edge weight with the linked register are stored in PATH/PATH_WEIGHT[DIST] and in block 432 the linked register is pushed onto NEW_LIST. In processing block 434 variable LIST is set to NEW_LIST and in block 436 variable DIST is toggled.

The example of FIG. 12 is further described below. Starting from A, the linked register is B:

1. B->PATH[0]=A, LIST={B} using [0] pointers

Nodes C and E are linked to B so the new list contains E and C:

2. E->PATH[1]=B, C->PATH[1]=B, NEW_LIST={E, C} using [1] pointers

Nodes C and E are linked and D is linked to C. The new list contains C, E, and D:

3. C->PATH[0]=E, E->PATH[0]=C, D->PATH[0]=C, NEW_LIST={C, E, D} using [0] pointers D and B are linked to C:

4. D->PATH[1]=C, B->PATH[1]=C, D links to A, but DIST is 1 so it is ignored, NEW_LIST={D,B} using [1] pointers 5. D links to A and DIST is 0, so there is a valid path starting with D.

The data structure at this point contains the following:

| Reg | PATH/WEIGHT[0] | PATH/WEIGHT[1] |
| --- | --- | --- |
| A | NULL-4 | |
| B | A-1 | |
| C | E-6 | B-2 |
| D | C-3 | C-3 |
| E | C-6 | B-5 |

The actual path is found by traveling this table backwards, starting with the returned register (D), starting on side 1, and alternating sides: D->C3->E6->B5->A1, where the weight is for the link with the previous node (i.e. the weight of C->E is 6). A somewhat strange case is the first link (D->C), whose weight can be found in the starting node (A) WEIGHT[0].

Note that this algorithm does not have a check to avoid duplicating nodes along a path. So it might also have returned in this case the "strange" loop: B->C->E->B->A. This is an artifact of there being a smaller loop (C-E-B) that attaches to the initial edge (A-B). While these strange loops may cause some inefficiency, they do not invalidate it. It may be more efficient to allow these loops to sometimes be found, rather than incur the cost of traveling each path before adding a node so that one can see if it is duplicated.

As described above in FIG. 9, once the shortest odd path connecting two nodes is found, the list of edges is sorted, and the first edge is broken. This process can recursively continue to break other edges as necessary. The broken edge(s) can be restored to produce a solution. That is, the code breaks an edge, sees how expensive the total solution is, then unbreaks the edge and tries another solution. Eventually, it picks the best solution and breaks those edges, and leaves them broken.

The total weight of this solution can be compared with the total weight of the best-known solution. If the present solution is better it can replace the previously 'best' solution. If the number of solutions found exceeds some threshold, processing can be halted to handle the case where the number of possible solutions is excessive and computing each one would take an arbitrarily large amount of time.

For example, given the graph (with weights shown): A-B 2, B-C 2, C-D 2, D-A 2, B-D 3, then there are two shortest odd cycles: ABD and BCD. By just taking the shortest weight, one would break either AB or AD, then recursively break BC or CD. For all of these solutions, the total weight would be four. However, if one chose the locally less optimal initial break of BD, this would also break the second loop resulting in a total weight of three, which is globally superior.

In another exemplary embodiment, an assembler can manipulate, e.g., insert and/or modify, instructions so that some register references are made to alternative memory, e.g., alternative registers or local memory, for the case where the program code requires more physical registers than the hardware provides and the remaining references can be successfully allocated to the existing physical registers. Such re-allocations can be referred to as "spilling" a register from its normal bank (e.g., GPR) to another area (e.g. local memory).

Figure 13:
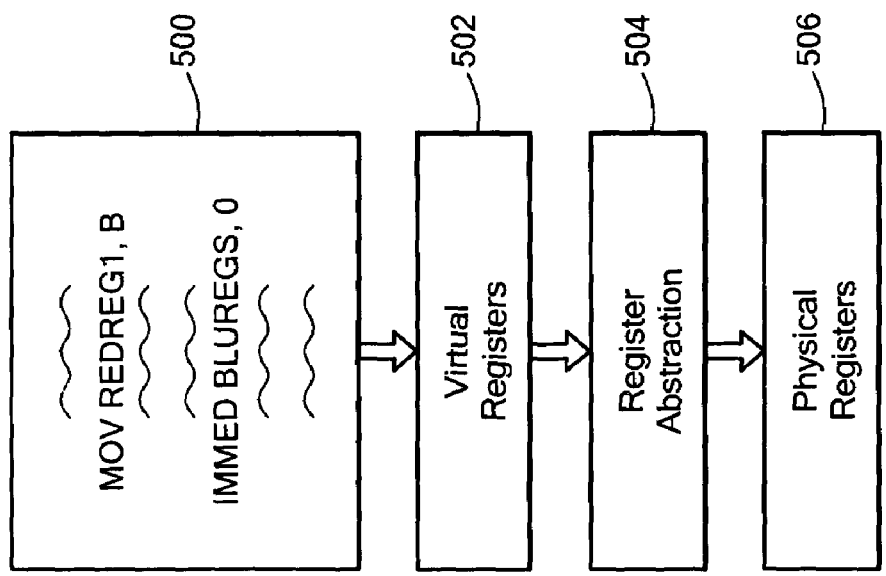
FIG. 13 is a schematic depiction of a portion of spilling registers.

In one embodiment shown in FIG. 13, a source code file 500 making reference to various virtual registers, e.g., REDREG1, BLUREG5, is processed by assembler where the virtual registers 502 are identified and allocated to an abstraction of the physical registers 504. It is understood that virtual registers are registers referenced in assembler code that do not correspond to a specific register in hardware. That is, the assembler maps virtual registers to physical registers for the target hardware. It is further understood that in conventional assembler code programmers reference particular hardware resources, e.g., register R0. In an exemplary embodiment of the assembler described herein, the physical register abstraction 504 includes a number of physical registers. If the number of abstracted physical registers is no greater than the number of actual physical registers on the target hardware, no spilling is necessary, and registers are mapped to the physical registers 506.

If spilling is required, then one or more abstract physical registers are selected to be spilled to alternate memory, such that the remaining abstract physical registers may be mapped to the actual physical registers. There may be a performance penalty to the alternate memory, so it is desirable to spill the least costly set of registers, where cost may be measured in terms of number of modified uwords (microwords), and/or other metrics.

Figure 14:
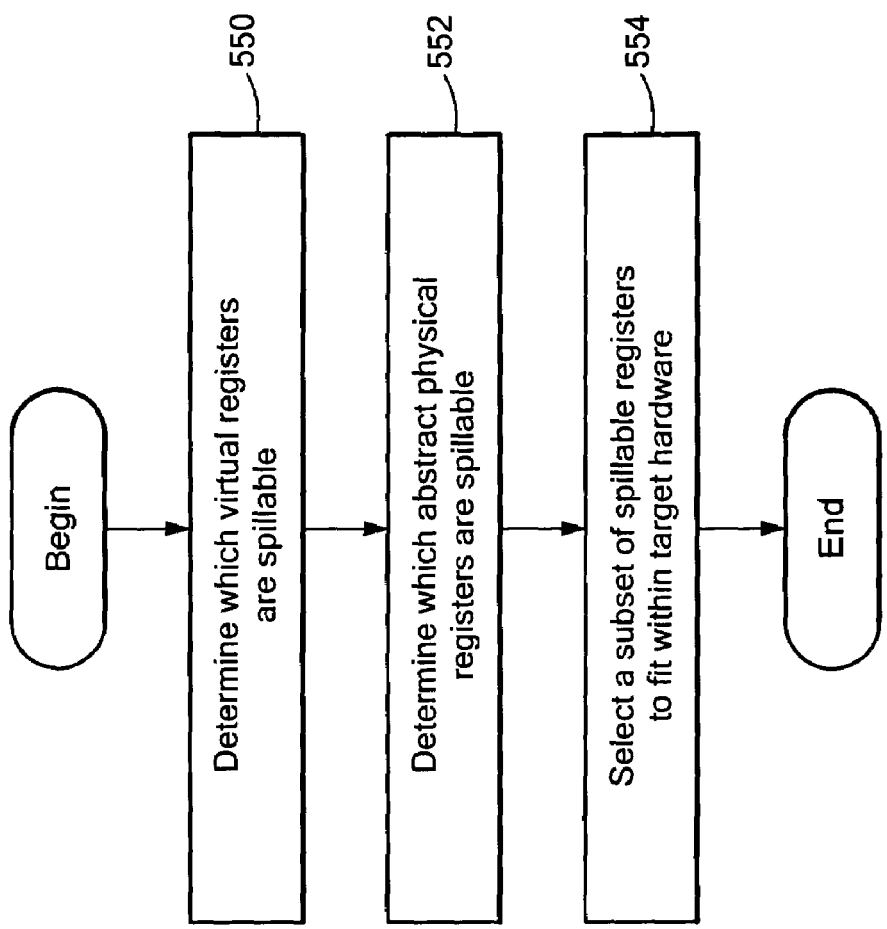
FIG. 14 is a flow diagram showing an exemplary implementation of register spilling.

FIG. 14 shows an exemplary process to spill registers. In processing block 550, some virtual registers may be marked or listed as being unspillable. This may be due to constraints that the programmer has placed in the code. For example, a particular section of code may be marked as being part of the critical path so that it should not be modified. It may also be undesirable to spill certain registers due to hardware constraints. For example the code may compute an address to branch to, so that the code can be considered as a table, with a particular entry being branched to based upon some run-time value. In this case, if the assembler were to insert instructions inside this table, the instruction spacing would change resulting in the modified code behaving in an improper manner. In such cases, the registers associated with such instruction sequences may also be marked as unspillable.

After the initial allocation of virtual registers to abstract physical registers, if any of the virtual registers that are mapped to a given physical register are marked as unspillable, then that abstract physical register is marked as unspillable. In order to minimize the number of such abstract physical registers, the allocation should be done so as to attempt to place spillable virtual registers into some of the physical registers and unspillable virtual registers in other physical registers.

In processing block 552, it is determined which abstract physical registers are spillable. In processing block 554, a subset of spillable registers is selected to fit within the target hardware. In one embodiment, the selection should minimize some cost function.

In an exemplary embodiment, to allocate virtual registers to physical registers a heuristic is used to arrange the virtual registers in some order. Then the virtual registers, in the order specified, are "colored." That is, each virtual register is assigned a number (color) that corresponds to the address of the physical register. There is a restriction that any register, as it is colored, cannot share the same color with a pre-computed list of "interfering" registers. Typically, as each register is being colored, an attempt is made to color it with increasing colors (i.e. 0, 1, 2, etc.) until a color is found where there are no interferences.

Figure 14A:
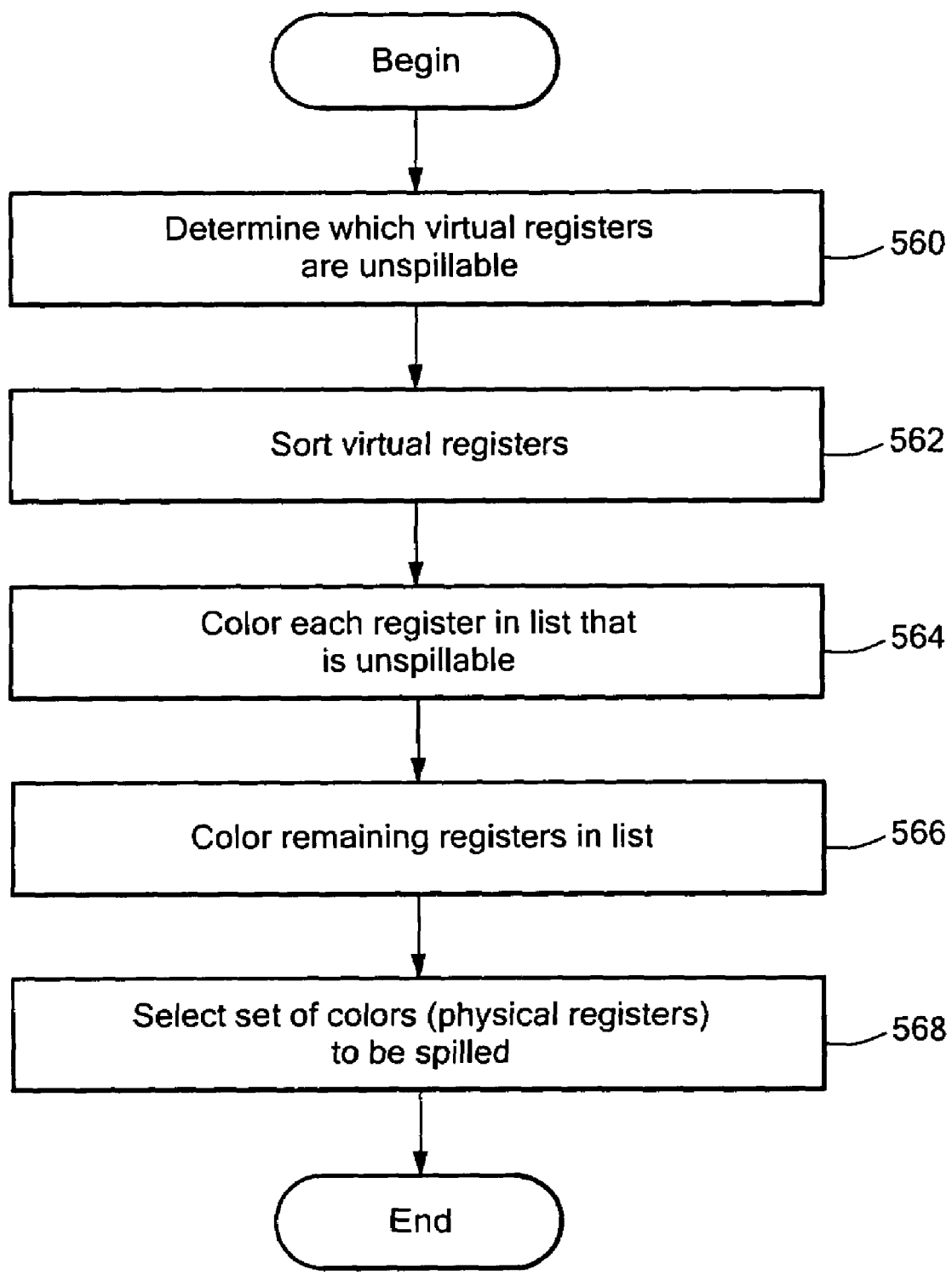
FIG. 14A is a flow diagram showing a further implementation of register spilling.

To improve the efficiency of the spilling process, an alternate coloring may be performed as shown in FIG. 14A, in which like reference numbers indicate like processing blocks with FIG. 14. In processing block 560 it is determined which virtual registers are spillable and in processing block 562 the virtual registers are sorted.

In the first pass, all of the unspillable registers are colored in processing block 564, which tends to place these registers together (i.e., the have the same color). Then in a second pass in processing block 566, the remaining registers are colored. Those that cannot be colored with any of the colors of the unspillable virtual registers become candidates for spilling.

Then a set from the spillable registers is chosen to be spilled in processing block 568. This is typically done to minimize some cost function, where the cost might represent the number of instructions that need to be modified.

It is understood that depending on the architecture of the target hardware, there may be additional considerations in determining which registers to select for spilling and how to implements spilling for the selected registers. For example, if the alternative memory for spilled registers has a single read port, then there is a constraint where two physical registers that are both used as source operands to one or more instructions cannot both be spilled. In this case, there are typically two banks of abstract physical registers being spilled.

Figure 15:
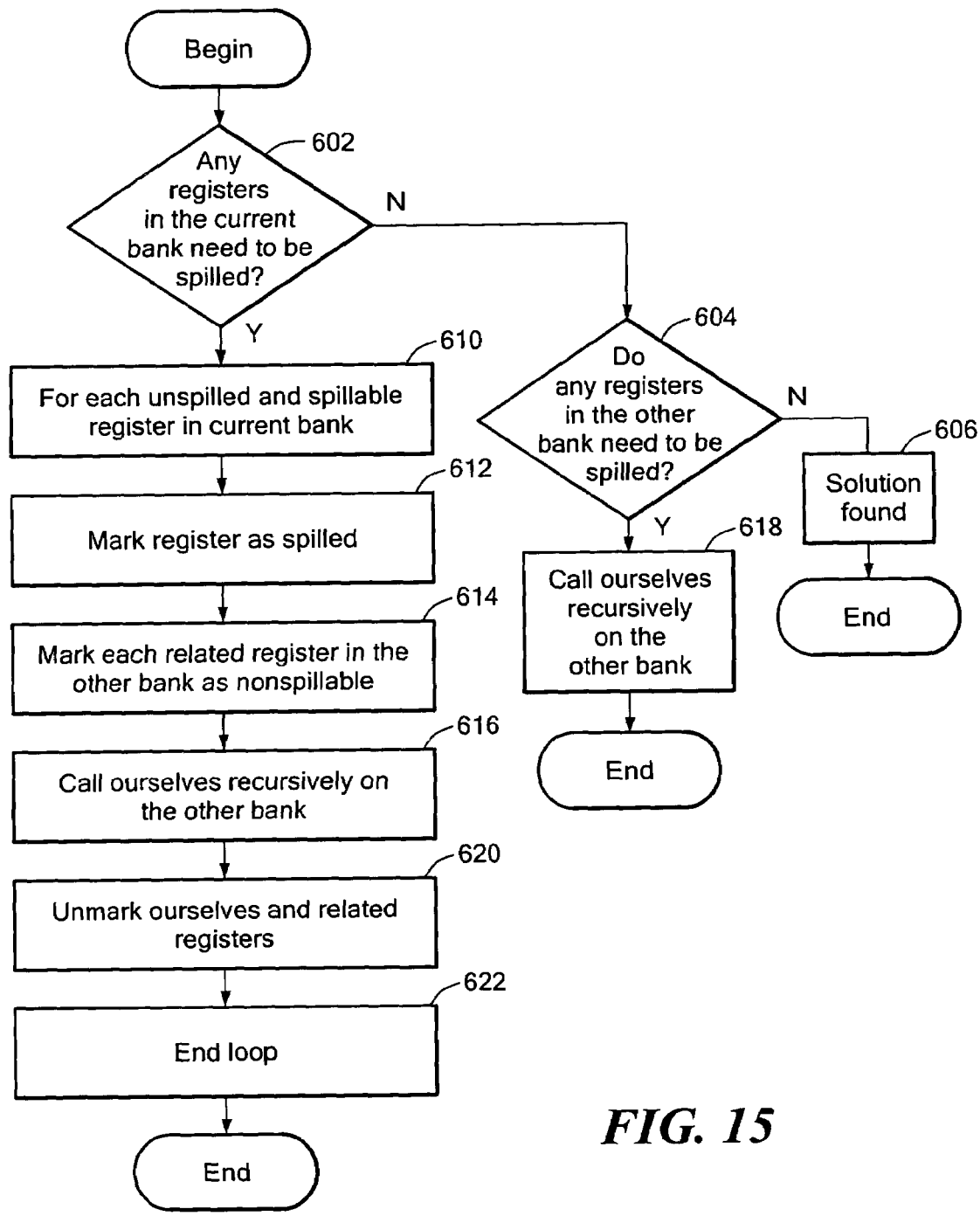
FIG. 15 is a flow diagram showing further details of register spilling.

FIG. 15 shows an exemplary implementation to spill registers for such target hardware. In processing block 602, it is determined whether any registers in the current bank of registers need to be spilled. If not, then in processing block 604 it is determined whether there are any registers that need spilling in the other bank. If not, a solution has been found in processing block 606 and processing is complete. If there are still registers that need to be spilled in the other bank, as determined in block 604, then this routine is called recursively on the other bank in processing block 618.

If there are registers in the current bank that need to be spilled as determined in block 602, in processing block 610 a loop is executed for each register in the current bank that is spillable, but not yet spilled. For each such register, it is marked as spilled in processing block 612 and all of the related registers in the other bank are marked as unspillable in processing block 614. This routine is then called recursively on the other register bank in processing block 616. In processing block 620, the register in this bank and the related registers in the other bank are unmarked, and the loop continues.

In one embodiment, each solution is associated with a weight or cost. Whenever a solution is found, if it has less cost than the current "best" solution, it is remembered as the new "best" solution. If some number of solutions has been found, the recursive looping may be terminated in the interest of bounded execution time; with the best solution found so far being used. If some number of iterations is performed without finding any solutions, then the recursive looping may be terminated with the algorithm failing to find a viable solution.

Figure 16:
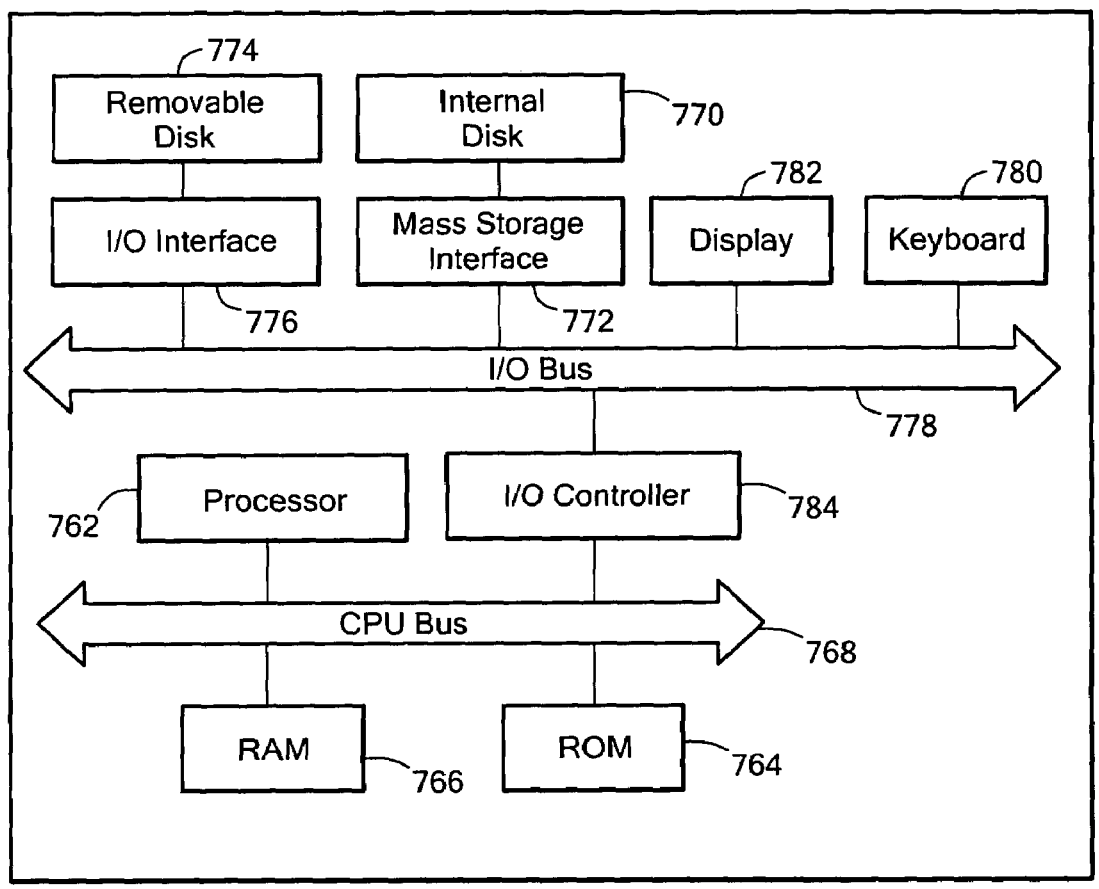
FIG. 16 is a schematic representation of an exemplary computer system suited to run an assembler to address register conflicts.

Referring to FIG. 16, an exemplary computer system 760 suitable for use as system 102 (as a development/debugger system and, therefore, for supporting an assembler to avoid register bank allocation errors including register bank conflicts and insufficient number of physical registers. The assembler may be implemented in a computer program product tangibly embodied in a machine-readable storage device for execution by a computer processor 762; and methods may be performed by the computer processor 762 executing a program to perform functions of the tool by operating on input data and generating output.

Suitable processors include, by way of example, both general and special purpose microprocessors. Generally, the processor 762 will receive instructions and data from a read-only memory (ROM) 764 and/or a random access memory (RAM) 766 through a CPU bus 768. A computer can generally also receive programs and data from a storage medium such as an internal disk 770 operating through a mass storage interface 772 or a removable disk 774 operating through an I/O interface 776. The flow of data over an I/O bus 778 to and from devices 770, 774, (as well as input device 780, and output device 782) and the processor 762 and memory 766, 764 is controlled by an I/O controller 784. User input is obtained through the input device 780, which can be a keyboard, mouse, stylus, microphone, trackball, touch-sensitive screen, or other input device. These elements will be found in a conventional desktop computer as well as other computers suitable for executing computer programs implementing the methods described here, which may be used in conjunction with output device 782, which can be any display device (as shown), or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 770 and removable disks 774; magneto-optical disks; and CD-ROM disks. Any of the foregoing may be supplemented by, or incorporated in, specially-designed ASICs (application-specific integrated circuits).

Typically, processes reside on the internal disk 774. These processes are executed by the processor 762 in response to a user request to the computer system's operating system in the lower-level software 105 after being loaded into memory. Any files or records produced by these processes may be retrieved from a mass storage device such as the internal disk 770 or other local memory, such as RAM 766 or ROM 764.

The system 102 illustrates a system configuration in which the application software 104 is installed on a single standalone or networked computer system for local user access. In an alternative configuration, e.g., the software or portions of the software may be installed on a file server to which the system 102 is connected by a network, and the user of the system accesses the software over the network.

Other embodiments are within the scope of the following claims.

What is claimed is:

1. A method of allocating registers in an assembler, comprising:
processing assembler code to avoid a register bank allocation error including at least one of a register bank conflict and an insufficient number of physical registers in target hardware;
automatically manipulating instructions to avoid the register bank allocation errors;
coloring a register graph to detect the register bank conflict;
identifying registers adjacent to each other in the graph having the same color; and
finding a shortest path having an odd length connecting the registers adjacent to each other having the same color.

2. The method according to claim 1, wherein the register bank conflict is associated with instructions in which first and second operands have respective first and second source registers located in a first one of first and second register banks and further including inserting an instruction to assign the first operand to a temporary register.

3. The method according to claim 2, wherein the register bank conflict is associated with instructions in which first and second operands have respective first and second source registers located in a first one of first and second register banks and further including inserting an instruction to move the first source register to local memory.

4. The method according to claim 1, further including sorting a list of edges in the graph associated with a path.

5. The method according to claim 4, further including sorting the list based upon a weight of the edges.

6. The method according to claim 5, further including repeating the finding and sorting to find further solutions to color the graph.

7. The method according to claim 1, further including manipulating instructions to spill one or more registers associated with the assembler code to alternative memory in the target hardware.

8. The method according to claim 7, further including mapping virtual registers to physical registers and spilling a sufficient number of physical registers to enable mapping between the virtual registers and the physical registers in the target hardware.

9. The method according to claim 7, wherein the non-register memory includes one or more of local memory, SRAM memory and DRAM memory.

10. The method according to claim 7, further including identifying registers that should not be spilled.

11. The method according to claim 7, further including determining first and second banks of abstract physical registers for target hardware having alternative memory with a single read port.

12. A method of allocating registers in an assembler, comprising:
processing assembler code to avoid a register bank allocation error including at least one of a register bank conflict and an insufficient number of physical registers in target hardware;
automatically manipulating instructions to avoid the register bank allocation error;
manipulating instructions to spill one or more registers associated with the assembler code to alternative memory in the target hardware;
determining first and second banks of abstract physical registers for target hardware having alternative memory with a single read port and assigning weights to entries in an array corresponding to a number of instructions that reference a physical register.

13. The method according to claim 12, further including sorting the array entries based upon the assigned weights.

14. An article, comprising:
a storage medium having stored thereon instructions that when executed by a machine result in the following:

processing assembler code to avoid a register bank allocation error including at least one of a register bank conflict and insufficient number of physical registers in target hardware;

automatically manipulating instructions to avoid the register bank allocation error;

coloring a register graph to detect the register bank conflict;

identifying registers adjacent to each other in the graph having the same color; and finding a shortest path having an odd length connecting the registers adjacent to each other having the same color.

15. The article according to claim 14, wherein the register bank conflict is generated by instructions in which first and second operands have respective first and second source registers located in a first one of first and second register banks and further including inserting instructions to assign the first operand to a temporary register and/or local memory.

16. The article according to claim 15, further including stored instructions to spill one or more virtual registers associated with the assembler code.

17. The article according to claim 16, further including stored instruction to spill a sufficient number of registers so that non-spilled ones of the registers can be mapped to physical registers in the target hardware.

18. The article according to claim 17, further including stored instructions to identify registers that should not be spilled.

19. A development/debugger system, comprising:
a processor;
an assembler to generate microcode that is executable in a said processor by processing assembler code to avoid a register bank allocation error including at least one of a register bank conflict and insufficient number of physical registers in target hardware;
automatically manipulating instructions to avoid the register bank allocation error;
coloring a register graph to detect the register bank conflict;
identifying registers adjacent to each other in the graph having the same color; and
finding a shortest path having an odd length connecting the registers adjacent to each other having the same color.

20. The system according to claim 19, wherein the register bank conflict is generated by instructions in which first and second operands have respective first and second source registers located in a first one of first and second register banks and further including inserting instructions to assign the first operand to a temporary register and/or local memory.

21. The system according to claim 20, wherein the register bank conflict is generated by the insufficient number of physical registers and wherein manipulating the instructions includes spilling one or more of the physical registers to alternative memory.

22. A network forwarding device, comprising:
at least one line card to forward data to ports of a switching fabric;
the at least one line card including a network processor having multi-threaded microengines configured to execute microcode, wherein the microcode comprises a microcode developed using an assembler that
processed assembler code to avoid a register bank allocation error including at least one of a register bank conflict and insufficient number of physical registers in target hardware;
automatically manipulated instructions to avoid the register bank allocation error;
coloring a register graph to detect the register bank conflict;
identifying registers adjacent to each other in the graph having the same color; and
finding a shortest path having an odd length connecting the registers adjacent to each other having the same color.

23. The device according to claim 22, wherein the register bank conflict was generated by instructions in which first and second operands have respective first and second source registers located in a first one of first and second register banks and further including inserting an instruction to assign the first operand to a temporary register and/or local memory.

24. The device according to claim 23, wherein the register bank conflict was generated by the insufficient number of physical registers and wherein the inserted instructions include spilling one or more of the physical registers to alternative memory.

* * * * *

UNITED STATES PATENT AND TRADEMARK OFFICE
CERTIFICATE OF CORRECTION

| | | |
|---|---|---|
| PATENT NO. | : 7,478,374 B2 | Page 1 of 1 |
| APPLICATION NO. | : 10/807218 | |
| DATED | : January 13, 2009 | |
| INVENTOR(S) | : Guilford | |

It is certified that error appears in the above-identified patent and that said Letters Patent is hereby corrected as shown below:

In column 14, line 2, in Claim 1, delete "errors;" and insert -- error; --, therefor.

Signed and Sealed this

Twelfth Day of May, 2009

JOHN DOLL
*Acting Director of the United States Patent and Trademark Office*